United States Patent [19]
Chattopadhyay et al.

[11] Patent Number: 5,974,459
[45] Date of Patent: Oct. 26, 1999

[54] TELECOMMUNICATIONS NETWORK DEVOID OF A DISTINCT NETWORK MANAGEMENT LAYER

[75] Inventors: Swapan K. Chattopadhyay, Howell; Arabinda Mukherjee, South Brunswick, both of N.J.

[73] Assignee: AT&T Corp., Middletown, N.J.

[21] Appl. No.: 08/787,783

[22] Filed: Jan. 23, 1997

[51] Int. Cl.[6] ............................. G06F 15/00; G06F 11/00
[52] U.S. Cl. ................................. 709/224; 714/4; 370/217
[58] Field of Search ......................... 395/200.53, 200.54, 395/182.02, 184.01; 379/1, 9, 14, 2, 26, 33; 370/216–220, 241–242, 245, 247, 469, 389; 709/223, 224; 714/4, 47

[56] References Cited

U.S. PATENT DOCUMENTS

| | | | |
|---|---|---|---|
| 5,652,787 | 7/1997 | O'Kelly | 379/112 |
| 5,680,325 | 10/1997 | Rohner | 395/500 |
| 5,680,437 | 10/1997 | Segal | 379/10 |
| 5,726,979 | 3/1998 | Henderson et al. | 370/254 |
| 5,761,432 | 6/1998 | Bergholm et al. | 395/200.56 |
| 5,764,977 | 6/1998 | Oulid-Aissa et al. | 707/10 |
| 5,790,634 | 8/1998 | Kinser, Jr. et al. | 379/29 |
| 5,845,080 | 12/1998 | Hamada et al. | 709/224 |
| 5,848,244 | 12/1998 | Wilson | 709/221 |
| 5,864,608 | 1/1999 | Brownmiller et al. | 379/113 |
| 5,864,662 | 1/1999 | Brownmiller et al. | 714/43 |
| 5,870,565 | 2/1999 | Glitho | 709/249 |
| 5,870,667 | 2/1999 | Globuschutz | 455/67.1 |
| 5,872,912 | 2/1999 | Brownmiller et al. | 714/47 |

OTHER PUBLICATIONS

Gianelli, M., et al., Operations Support Systems in Italy: Experiences and Perspectives of Integration, Telecomm. Symposium, Jul. 1990 SBT/IEEE, pp. 24.4.1–24.4.5.

Wessler, L., "Integration of Telecom Energy Systems Into Network Management Nodels Using Remote Intelligent Supervision, Monitoring, and Control," INTELEC '90: 12th Int'l. Telecomm. Energy Conf., IEEE, pp. 275–282, 1990.

Bagnasco, E. et al., "A European Survey of Public Networks Management Systems," IEEE Colloq. (1990) No. 017: Network Management and Signalling, pp. 2/1–2/7

Bernstein, L., et al., "Network Architectures for the 21st Century," IEEE Communications, pp. 24–28, Jan. 1996.

Wu, L., et al., "TMN Communication Protocols and Performance Evaluation," SOUTHEASTCON, Sep. 1996 Proceedings, IEEE, pp. 578–581.

*Primary Examiner*—Zarni Maung
*Assistant Examiner*—Andrew Caldwell

[57] ABSTRACT

A telecommunication network without a network management layer meets operational objectives by providing at least one hot standby system which replaces a malfunctioning element of a service-providing node in the event of any disruption in services. Each service-providing node includes n primary processors and k spare processors. The telecommunications network implements all layers of the Telecommunication Management Network (TMN) standard except for the network management layer. The system therefore implements the business managemen, service management, and element management layers. An operation administration and maintenance server monitors the network to detect a malfunctioning element of a service-providing network node. Upon detecting a fault, the operation administration and maintenance server sends an out of service message to a central network planning and operations center and/or notifies an on site work force of the probable trouble. While the failure is being repaired, a hot standby system takes over the function of the defective system.

20 Claims, 6 Drawing Sheets

TELECOMMUNICATIONS NETWORK DEVOID OF A DISTINCT NETWORK MANAGEMENT LAYER

BACKGROUND OF THE INVENTION

This invention relates to network management, and more particularly to communications management in a multi-vendor environment, enabling interoperability, simplifying operations, and supporting abstraction of functions provided by network elements. For purposes of illustration, the invention will be described using the Telecommunications Management Network (TMN) framework as a reference model. TMN standards are being developed by International Telecommunications Union (ITU). It will be understood, however, that the invention is equally applicable to other non-TMN compliant networks as well.

Over the past two decades, network elements essentially used proprietary technology which was very expensive and complex due to the fact that it was hardware and software fault-tolerant. Various network management functions such as traffic management, maintenance, configuration management, and routing management were performed by experienced technicians making network management very labor intensive. Moreover, adding a new service or network element required planning, design, engineering, development, and deployment by a team of engineers for 2–3 years, adding to unit cost as well as time to market.

There has been a significant improvement in technology in recent years. The price-to-performance ratio of computing technology, when compared to 1980's technology, has improved by a factor of 100 in the 1990's, and is expected to increase by a factor of 1000 in the next decade. Significant improvement in microprocessor technology, memory chip technology, and application of Very Large Scale Integration (VLSI) has resulted in significant improvement in reliability, availability, processing power, and memory capacity. As a result, proprietary technology is progressively being replaced by commercial off-the-shelf technology. Network elements based on these technologies and application of n+k spare techniques can achieve availability and reliability comparable to fault-tolerant network elements. Also, the current technology can thus be maintained by vendor-supplied technicians instead of a team of experienced technicians previously hired by the service providers for maintaining proprietary technology, leading to further cost savings.

Accordingly, it is not necessary to develop and maintain Network Management Layers, associated interfaces, and core Work Centers (WC's) for network management. It would be more cost effective to have one or more hot standby service processing systems which will take over the failed service processing system. The present invention simplifies resolution of Out Of Service (OOS) conditions by replacing one or more defective boards, or reloading the software or the data bases in the event of receiving an OOS message from Operation Administration and Maintenance Server. It thus follows that there is no need for a complex infrastructure, resulting in significant unit cost improvement.

In view of the foregoing, it is an object of this invention to provide a simplified Telecommunications Management Network (TMN) framework which provides a framework of communications management in a multi-vendor environment, improves and simplifies operations, supports abstraction of functions provided by network elements, and reduces unit cost.

It is another object of this invention to provide a framework of communications management in a multi-vendor environment that improves and simplifies operations, supports abstraction of functions provided by network elements, and reduces unit cost by eliminating the Network Management Layer and its associated Telecommunications Management Network interfaces (TMN I/F).

It is still another object of this invention to provide a framework of communications management in a multi-vendor environment that improves and simplifies operations, supports abstraction of functions provided by network elements, and reduces unit cost by eliminating network management core Work Centers (WC's) managing real-time operations in conjunction with Network Management Layer Operations Support Systems (OSS's).

It is yet another object of this invention to provide a framework of communications management in a multi-vendor environment that improves and simplifies operations, supports abstraction of functions provided by network elements, and reduces unit cost by expanding the role of the Network Planning and Engineering Systems to that of a Central Network Planning and Operations Center, such that it performs critical functions of maintaining r hot standby service processing systems on an ongoing basis, where r is greater than or equal to one.

SUMMARY OF THE INVENTION

These and other objects of the invention are accomplished in accordance with the principles of the invention by providing methods for simplifying operations and supporting abstraction of functions provided by network elements and reducing unit cost. In order to accomplish the above, the Network Management Layer, which is traditionally between the Service Management Layer and the Element Management Layer, is eliminated. As a result, Telecommunications Management Network interfaces (TMN I/F) associated with the Network Management Layer are also no longer required.

Besides the inherent cost saving in not having to develop a Network Management Layer OSS or Telecommunications Management Network interfaces (TMN I/F) associated with it, there is additional cost saving associated with this method. Network management core Work Centers (WC's) which were used to constantly monitor the network via the Network Management Layer OSS's for traffic as well as maintenance are also, as a result, no longer required. In order to accomplish the above, this invention uses one or more hot standby service processing systems. While the hot standby systems do not participate in actual call processing, query processing, data processing, or inquiry processing, they do stay current. In the event of any alarm conditions, such as those associated with maintenance or traffic related problems in the network, the hot standby system takes over while the Operation Administration & Maintenance Server (OA&M) notifies the On Site Work Force (OSWF) of any particular service processing system that is down. Thus, by having one or more hot standby systems, the need to plan, design, engineer, develop, and deploy the Network Management Layer and its related interfaces is not required, resulting in simplification of operation and support of functions provided by network elements, as well as unit cost savings.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to a Telecommunications Management Network (TMN) which is capable of providing a framework for communications management in a multi-vendor environment, enables interoperability, simplifies operations, and supports abstraction of functions provided by network elements. Although the invention will be illustrated in conjunction with a Telecommunications Management Network (TMN), it will be understood that it is applicable to other non-TMN compliant networks where the cost of developing and managing the Network Management Layer exceeds that of one or more hot standby systems and associated spare parts, and the mean time between failure is greater than the mean time to repair and reload software and/or data base.

Figure 1:
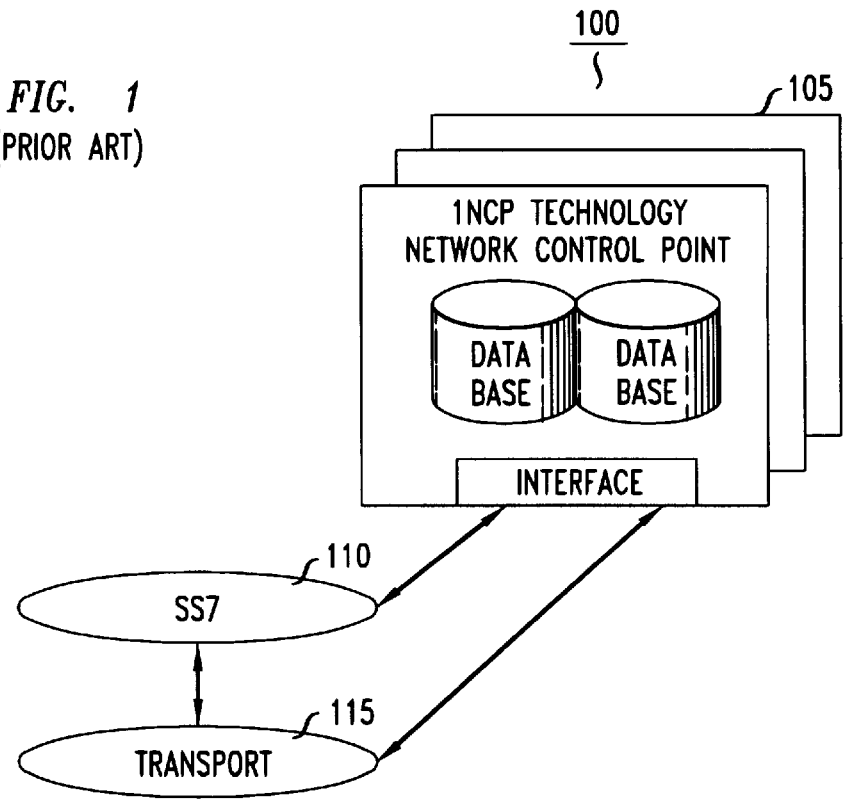
FIG. 1 is a simplified block diagram of conventional 1NCP (Network Control Point) technology and architecture.

FIG. 1 shows a block diagram of 1NCP technology and architecture 100 using proprietary technology and mated Network Control Points 105. Mated Network Control Points 105 are used for reliability and to maintain data associated with customers. This data typically comprises phone numbers of customers, accounting information, and information regarding calls made. SS7 Signaling Network 110 is used to query this data base for various purposes, such as routing calls to a different number. Transport network 115 is used for voice paths. 1NCP technology, used in the early 1980's, was hardware and software fault-tolerant, had a processor speed of 1 MHZ, word size of 32 bits, one mega byte of main memory, close to $1.0 million in cost, and the people at the core Work Centers (WC's) performed labor intensive maintenance functions.

Figure 2:
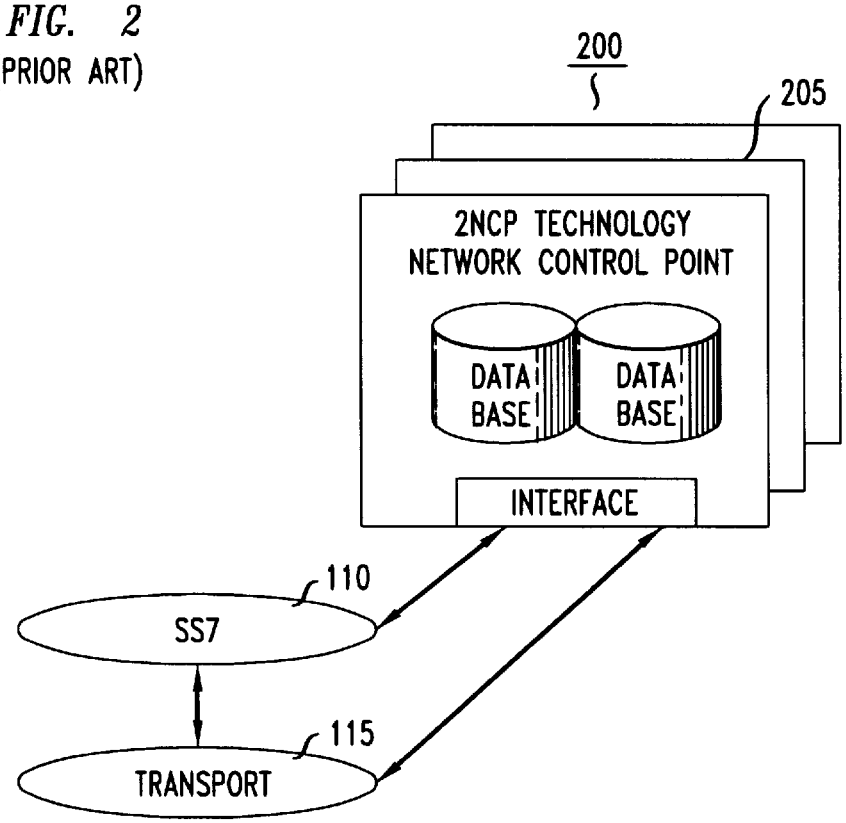
FIG. 2 is a simplified block diagram of conventional 2NCP (Network Control Point) technology and architecture.

1NCP technology was replaced in mid 1980's by 2NCP technology and architecture 200 shown in FIG. 2. Similar to 1NCP technology, 2NCP technology also used proprietary technology. SS7 signal network 110, and Transport Network 115 performed functions similar to those performed in the case of 1NCP technology. However, its total processor speed had increased to 300 MHZ (6 processors at 50 MHZ/ processor), word size had remained at 32 bits, main memory had increased to 512 mega bytes, cost had increased to $2.5 million, and the people at the core Work Centers (WC's) still performed labor intensive maintenance functions.

Figure 3:
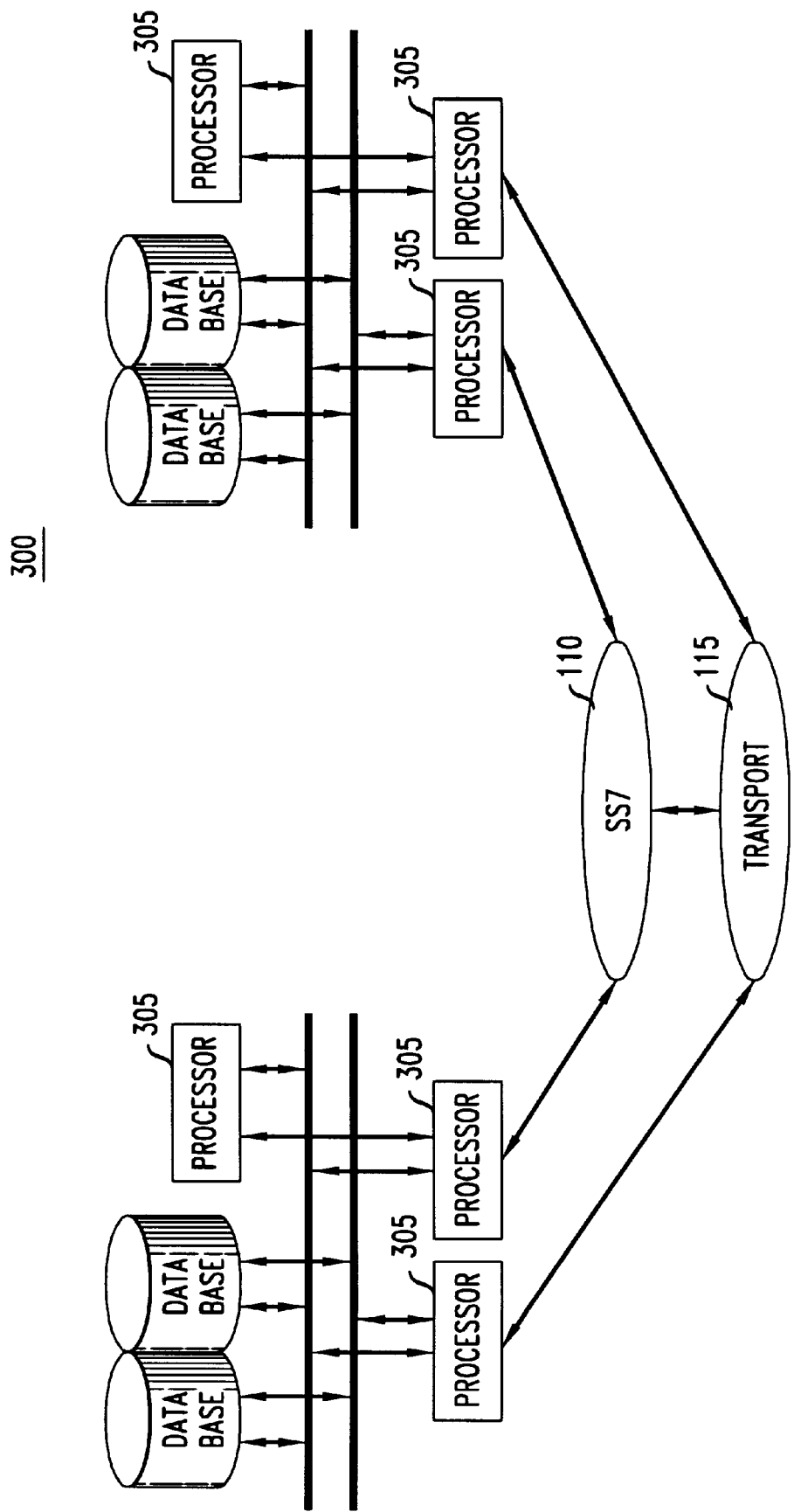
FIG. 3 is a simplified block diagram of conventional USDS (Universal Services Data Structure) and SD (Services Directory) technology and architecture.

Telecommunications technology currently in use does not use proprietary technology. It has been replaced with cheaper off-the-shelf commercial technology. FIG. 3 shows a simplified block diagram of Universal Services Data Structure (USDS) and Services Directory (SD) technology and architecture 300. Query Processing Devices (QPD's) 305, capable of processing all queries individually, are at two different sites to provide redundancy in case of a disaster at one of the two sites rendering the site incapable of performing service processing. SS7 Signaling Network 110 and Transport Network 115 perform the same functions as they did in the case of 1NCP and 2NCP technology. However, there are n+k spares for providing at most 15 minutes of down time per year. In addition, processor speed has increased to 1200 MHZ (20 processors at 60 MHZ/ processor), main memory has increased to 4 giga bytes, cost in comparison to 2NCP technology has dropped to $1.0 million per service processing system, but the people at the core Work Centers (WC's) still perform labor intensive maintenance functions.

Figure 4:
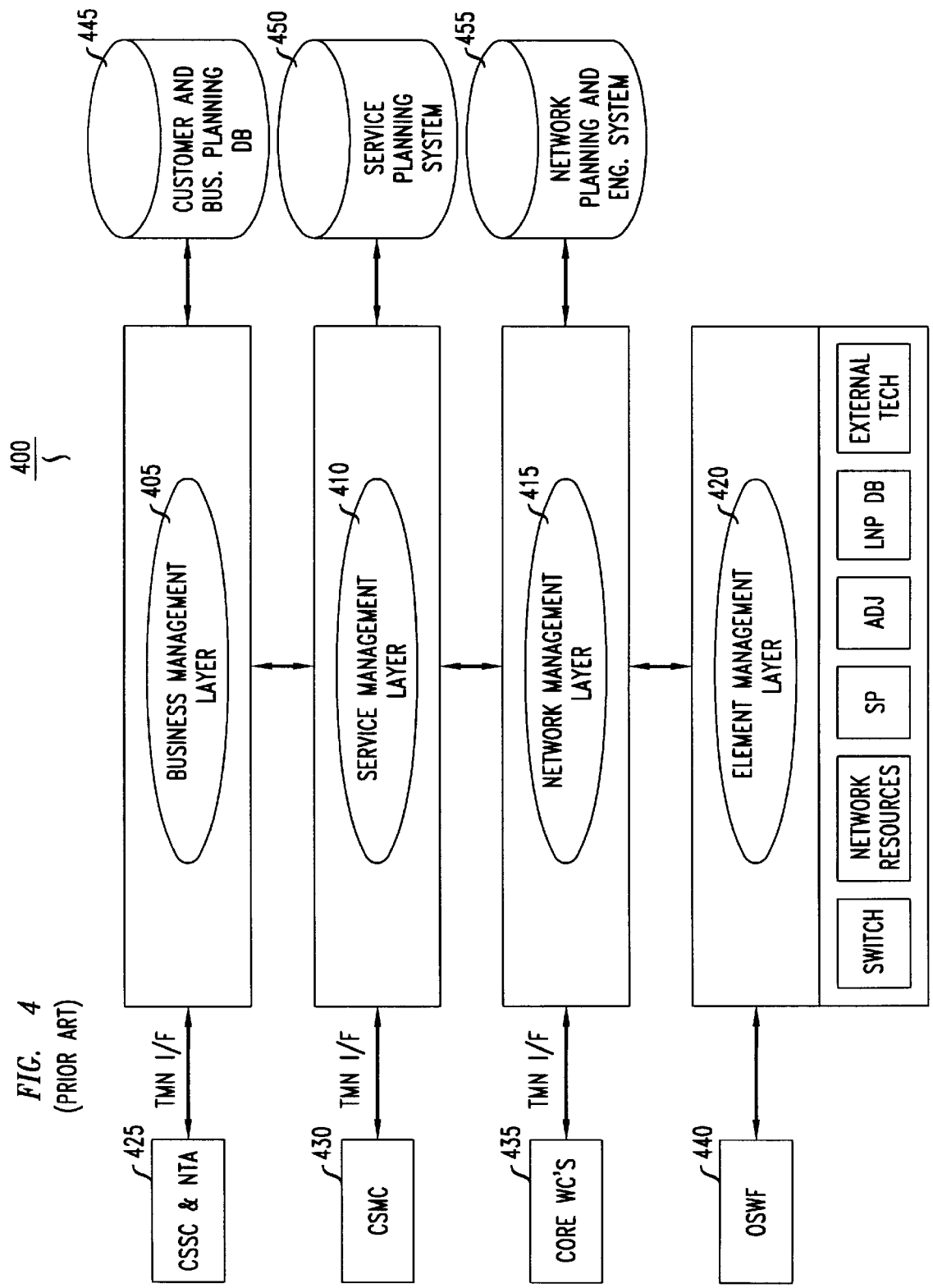
FIG. 4 is a simplified block diagram of conventional target logical operations architecture.

FIG. 4 shows a simplified block diagram of the TMN compliant target logical operations architecture 400. The logical operation architecture shown in FIG. 4 is organized as a series of layers, each one built upon its predecessor. The number of platforms within a layer as well as their functions and contents may differ from network to network. However, like most networks, the purpose of each layer is to provide certain services to the next higher layer, while details of how services are actually implemented are transparent to those layers.

The layers shown in logical operations architecture 400 are Business Management Layer 405, Service Management Layer 410, Network Management Layer 415, and Element Management Layer 420. As shown in FIG. 4, between each pair of adjacent layers there is a Telecommunications Management Network interface (TMN I/F). This Telecommunications Management Network interface (TMN I/F) defines which primitive operations and services the lower layer offers to the upper layer. There are similar interfaces between Business Management Layer 405 and Customer Sales and Support Center (CSSC) 425; Service Management Layer 410 and Customer Service and Management Center (CSMC) 430; Network Management Layer 415 and Element Management Layer 420 and Core Work Centers (WC's) 435, respectively. Customer and Business Planning Data Base 445, Service Planning System 450, and Network Planning and Engineering System 455 are outside the scope of the TMN model.

Customer Sales and Support Center (CSSC) 425 provides various sales related services to customers and is also used to keep a record of services ordered by customers. Customer related data is maintained by Customer & Business Planning Data Base. This data may be used for purposes of marketing existing or future products, as well as accounting and billing purposes. The personnel at Customer Service Management Center (CSMC) 430 provide manual control via platform software in Service Management Layer 410. These controls are typically either service related or customer related, namely, provisioning and reload of service logic programs, customer data and trouble isolation and resolution. Core Work Centers (WC's) 435 manage the network in real time, providing network maintenance functions by isolating troubles as well as running diagnostics and rerouting traffic.

Different layers provide different functions:
  Business Management Layer 405 is primarily used for sales, marketing, order entry, accounting, billing management and control functions;
  Service Management Layer 410 supports an abstraction of the entire network including features and services and their association with customers;
  Network Management Layer 415 manages and controls the entire network and the network elements comprising the network, responsible for network maintenance, traffic management, as well as performance and capacity management; and Element Management Layer 420 manages and controls network elements, supports abstraction of functions provided by network elements and provides Operation Administration & Maintenance (OA&M) interface to the network elements.

Figure 5:
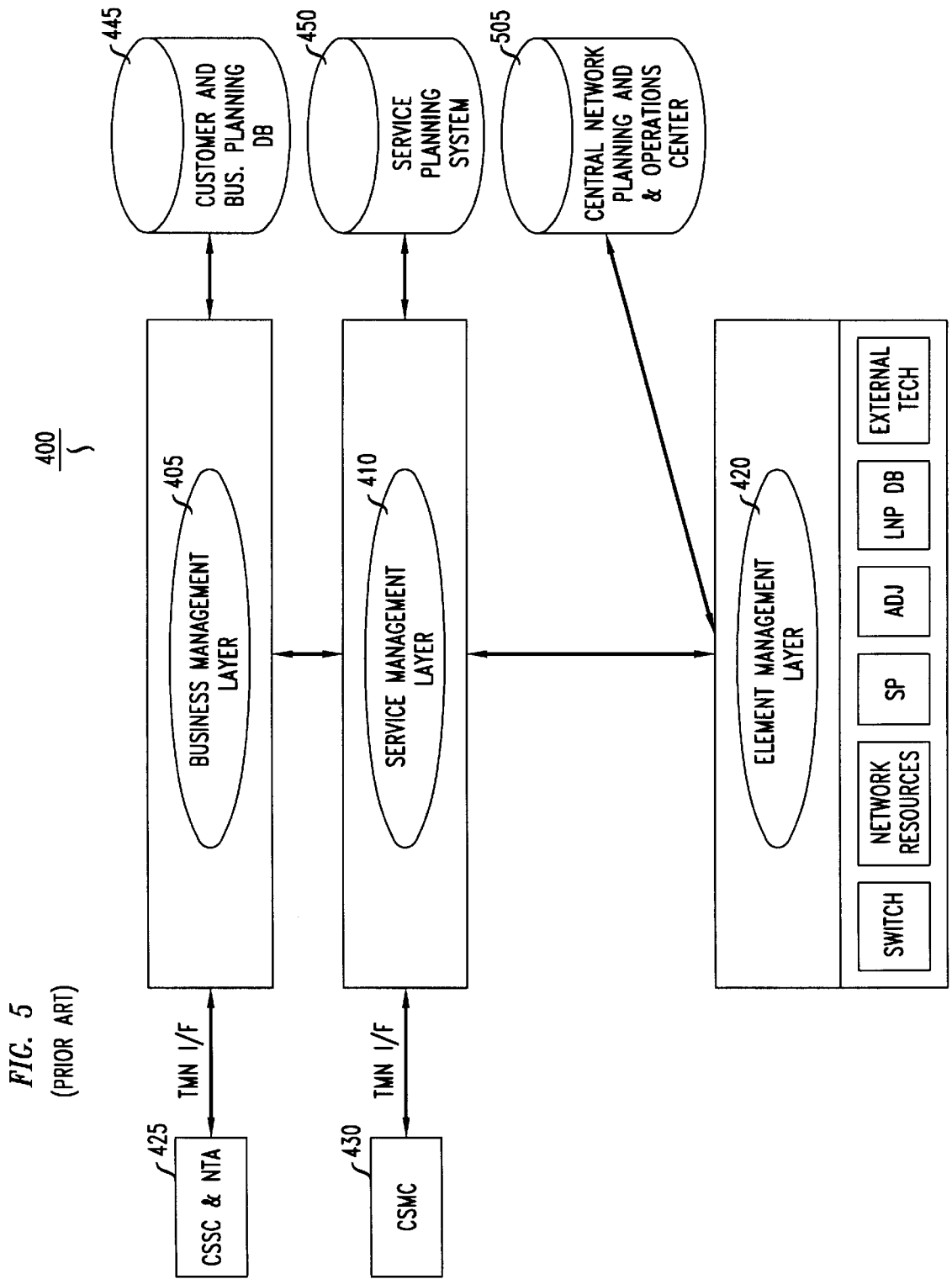
FIG. 5 is a simplified block diagram of this invention's logical network operations architecture.

FIG. 5 shows a simplified block diagram of this invention's TMN compliant network operations logical architecture 500. Similar to FIG. 4, between each pair of adjacent layers, there is a Telecommunications Management Network interface (TMN I/F). Similarly, there are interfaces between Business Management Layer 405 and Customer Sales and Support Center (CSSC) 425; Service Management Layer 410 and Customer Service and Management Center (CSMC) 430 and Element Management Layer 420 and Central Network Planning and Operations Center 505.

However, Network Management Layer 415 is not used in this architecture and accordingly, neither are the associated Telecommunications Management Network interfaces (TMN I/F) and core Work Centers (WC's) 435. The function of Network Planning & Engineering System 455, having an interface with Network Management Layer 415 of FIG. 4, is expanded to Central Network Planning & Operations Center 505 and has now an interface with Element Management Layer 420. Central Network Planning & Operations Center 505 performs network planning and engineering and is further expanded to include maintenance of the n+k spare and one or more hot standby systems. Though there is a cost associated with having hot standby systems, as long as this cost is less than the development cost of the Network Management Layer OSS and its associated interfaces, having hot standby systems would result in cost savings. Moreover, it is no longer necessary to have core Work Centers (WC's) 435 to manage the network. Thus, by providing one or more hot standby systems, the need for Network Management Layer and its associated interfaces as well as core Work Centers (WC's) is eliminated, resulting in cost savings.

Figure 6:
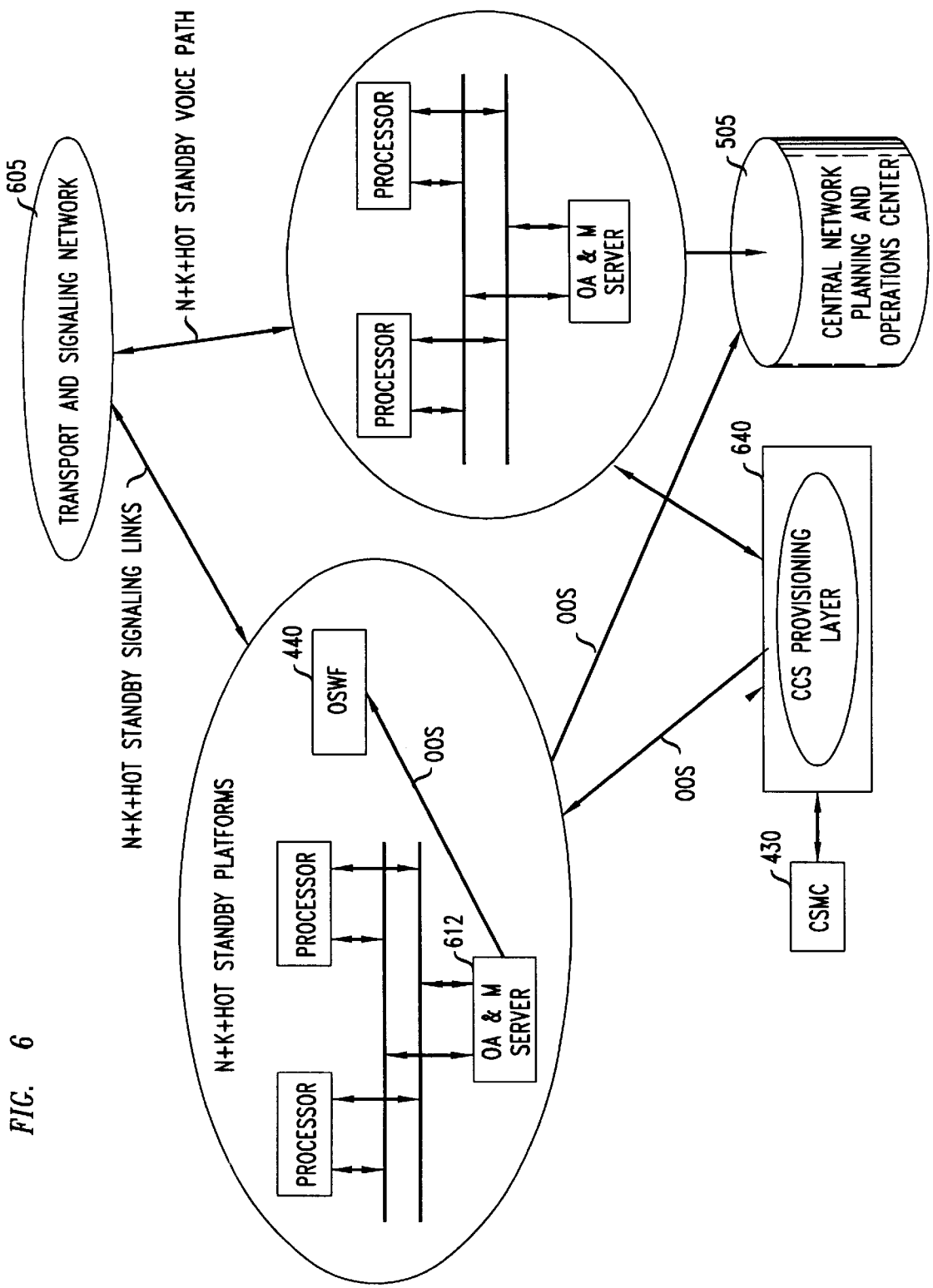
FIG. 6 is a simplified block diagram of the optimized network operations using the technology and architecture of FIG. 5.

FIG. 6 shows a simplified block diagram of optimized network operations 600 using the proposed network operations architecture of FIG. 5. Transport and Signaling Network 605 is similar to SS7 100 and Transport 115 networks of FIG. 3. Operation Administration and Maintenance (OA&M) server 612 monitors the network for any software and/or hardware related malfunctions. In the event any malfunction within the network element is detected, an Out Of Service (OOS) message is generated. Having detected the Out Of Service message, Operation Administration and Maintenance (OA&M) server 612 notifies On Site Work Force 440, Central Network Planning & Operations Center 505, and CCS Provisioning Layer 640. Central Network Planning & Operations Center 505 and Service Management Layer OSS are responsible for gathering information regarding the network. This information is used to determine performance and plan network capacity. On Site Work Force 440 is responsible for fixing the problem, whether hardware or software related, detected by Operation Administration and Maintenance server (OA&M) 612.

Figure 7:
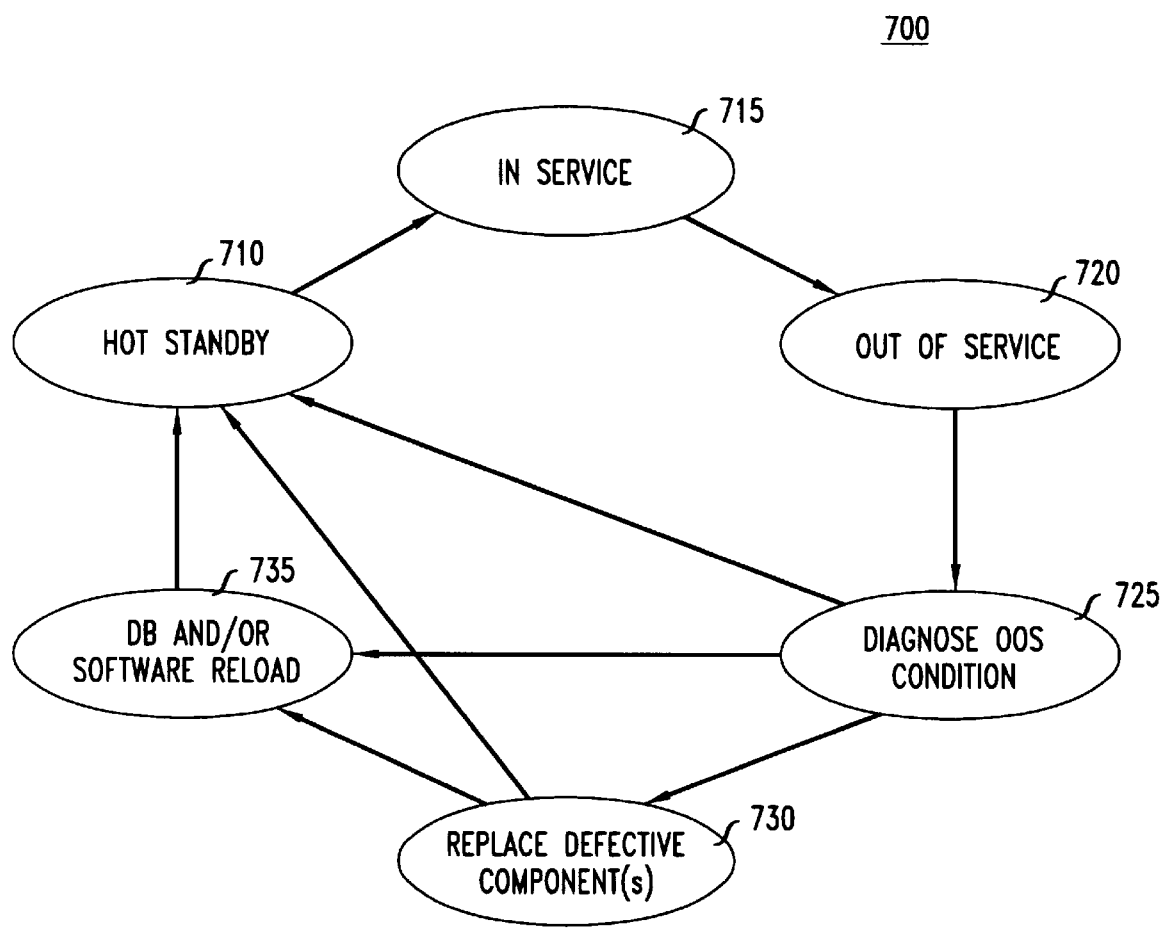
FIG. 7 is a simplified Service Processing System state transition block diagram.

FIG. 7 shows a simplified Service Processing System state transition block diagram 700. When an Out Of Service message 720 is received, it is diagnosed 725 to determine its nature. In the event the defect is software or data base related, the affected software and/or data base is reloaded 735. However, if the defect is hardware related, the hardware is replaced 730 and the software and/or data base previously resident in the defective hardware is reloaded 735. While the defective hardware component is being replaced or the defective software and/or data base is being reloaded, hot standby 710 takes over the function of the defective system. Following the correction of the defect, the repaired system is added back to the network as a hot standby system.

It will be appreciated that the described method of this invention is equally applicable to other networks, which also comprise a Network Management Layers which is more expensive to develop and maintain than one or more hot standby systems.

It will be understood that the foregoing is only illustrative of the principles of the invention and that various modifications can be made by those skilled in the art without departing from the scope and spirit of the invention. For example, the principle illustrated in FIG. 6 is equally applicable to the Signaling Links and the Voice Paths and can thus be replaced by an n+k spare and one or more hot standby systems, provided it is not cost prohibitive.

The invention claimed is:

1. A telecommunications network having service-providing nodes, a Business Management Layer, a Service management Layer, and an Element Management Layer, and without a Network Management Layer comprising:

a Customer Sales and Support Center for providing sales related services to customers;

a Customer Service Management Center for managing information regarding features and services offered to customers;

an Operation Administration and Maintenance Server for monitoring said service-providing nodes of said network and generating an Out Of Service message in the event of a malfunction detected in an element of one of said service-providing nodes;

at least one hot standby system that is associated with said one of said service-providing nodes and adapted to be engaged to said network, replacing said malfunctioning element of said one of said service-providing nodes upon an occurrence of said malfunction, where said one of said service-providing nodes comprises n concurrently operating processors as well as k concurrently operating spare processors and where said malfunctioning element is one of said n processors or one of said k processors; and a Central Network Planning and Operations Center communicating with said Element Management Layer to maintain said hot standby system.

2. The network defined in claim 1 wherein, said Operation Administration and Maintenance Server notifies said Central Network Planning and Operations Center in the event of said Out Of Service message.

3. The network defined in claim 1 wherein said central Network Planning and Operations Center maintains databases of said n+k cooperating processors as well as a database of said hot standby system.

4. The network defined in claim 1 wherein, said hot standby stays current with respect to said network but does not participate in service processing until said malfunctioning element of said one of said service-providing nodes goes off-line and said hot standby system goes on-line.

5. The network defined in claim 1 wherein, said Operation Administration and Maintenance Server notifies an On Site Work Force in the event of said Out Of Service message.

6. The network defined in claim 5 wherein said Out Of Service message instructs said On Site Work Force of probable trouble condition in said malfunctioning element of said one of said service-providing nodes.

7. The network defined in claim 6 wherein, said Out Of Service message instructs said On Site Work Force to replace said malfunctioning element of said one of said service-providing nodes followed by reloading said data base.

8. The network defined in claim 5 wherein, said Out Of Service message indicates corruption of a data base.

9. The network defined in claim 5 wherein, said Out Of Service message indicates failure associated with software malfunction.

10. In a network having a business management layer, service management layer, and an element management layer but devoid of a network management layer, and systems that comprise n+k concurrently operating elements, where n of said operating elements are sufficient to perform assigned tasks, thus making k of said operating elements active spares, a method comprising the steps of:

by means of an Operation Administration and Maintenance Server, monitoring said network for hardware and software related problems and generating an Out of Service message in the event of a malfunction in a system of said network;

maintaining a plurality of hot standby elements associated with at least some systems of said network (enhanced system), where each of said enhanced systems has at least one of said hot standby elements associated therewith;

providing database information to said hot standby elements from a Central Network Planning and Operations Center; and in the event of a malfunction in an element of one of said enhanced systems, placing the malfunctioning element off-line and placing one of the hot standby elements associated with the one of said enhanced system on-line.

11. The method defined in claim 10 further comprising the steps of:

notifying an On Site Work Force in the event of said Out Of Service message;

notifying a Service Management Layer OSS in the event of said Out Of Service message; and notifying a Central Network Planning and Operations Center in the event of said Out Of Service message.

12. The method defined in claim 11 wherein, said Operation Administration and Maintenance Server notifies said On Site Work Force in the event of said Out Of Service message.

13. The method defined in claim 11 wherein, said On Site Work Force provides maintenance of said system by isolating and diagnosing said Out Of Service condition.

14. The method defined in claim 11 wherein, diagnosing of said Out Of Service message results in replacement of a defective hardware.

15. The method defined in claim 14 wherein, replacement of said defective component is followed by reloading a database.

16. The method defined in claim 14 wherein, replacement of said defective component is followed by reloading software.

17. The method defined in claim 11 wherein, diagnosing of said Out Of Service message results in reloading a database.

18. The method defined in claim 11 wherein, diagnosing of said Out Of Service message results in reloading software.

19. The method defined in claim 10 wherein, said Central Network Planning and Operations Center provides database information to active elements in said enhanced systems as well as to said at least one hot standby system associated with each of said enhanced systems.

20. The method defined in claim 10 wherein, said hot standby system stays current with respect to said network but does not participate in processing until said system goes off-line and said hot standby system goes on-line.

* * * * *